No. 705,858. Patented July 29, 1902.
A. McWHORTER.
FERTILIZER DISTRIBUTER.
(Application filed Jan. 13, 1902.)
(No Model.)
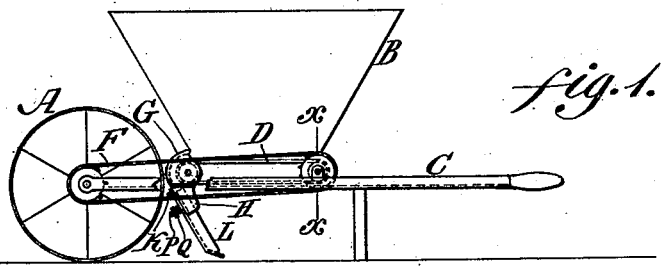
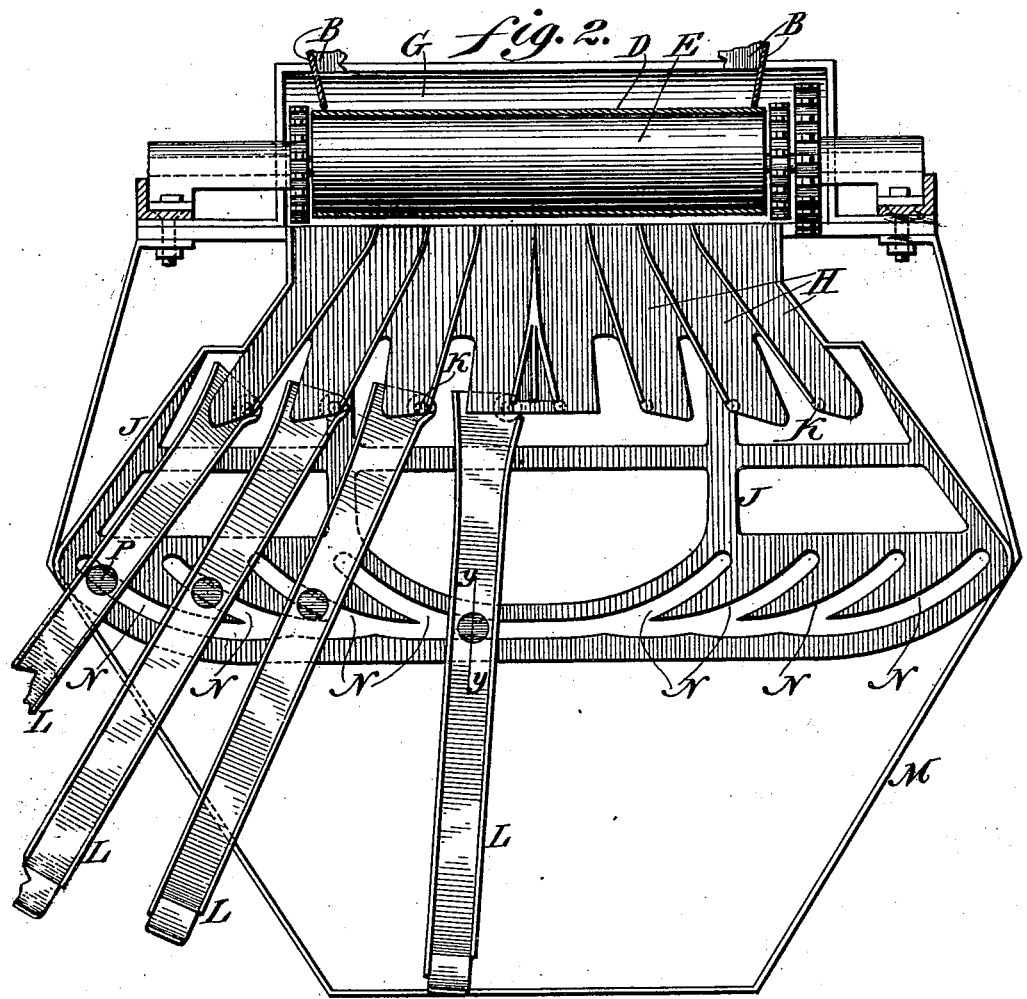
Inventor
Allen McWhorter.

UNITED STATES PATENT OFFICE.

ALLEN McWHORTER, OF NORFOLK, VIRGINIA, ASSIGNOR TO McWHORTER MANUFACTURING COMPANY, A CORPORATION OF NEW JERSEY.

FERTILIZER-DISTRIBUTER.

SPECIFICATION forming part of Letters Patent No. 705,858, dated July 29, 1902.

Application filed January 13, 1902. Serial No. 89,489. (No model.)

*To all whom it may concern:*

Be it known that I, ALLEN McWHORTER, a citizen of the United States, residing in the city of Norfolk, State of Virginia, have invented a new and useful Improvement in Fertilizer-Distributers, of which the following is a specification.

My invention consists of an improvement in fertilizer-distributers, the object being to provide a distribution device therefor whereby the fertilizer can be deposited in a manner best suited to the conditions and circumstances.

Figure 1 represents a side elevation of a fertilizer-distributer embodying my invention. Fig. 2 represents a section of a portion thereof, taken on the line $xx$, Fig. 1, and on an enlarged scale. Fig. 3 represents a fragmentary section taken on line $y y$, Fig. 2.

Similar letters of reference indicate corresponding parts in the figures.

Referring to the drawings, A designates the wheel, B the hopper, and C the handles on the frame, of a fertilizer-distributer of ordinary construction. In the bottom of the hopper is an endless belt D, passing around the rollers E at each end of the hopper and driven by the belt F, geared to the front wheel A in the usual manner.

The belt D delivers the fertilizer to a chute G, from the lower end of which extend the divergent channels H. Below the channels there is a frame J and at the end of each of said channels and on the under side thereof is a pin or stud K. The spouts L are provided with openings at their upper end which receive the stud K whereby they are pivoted at the lower end of said channels, and said spouts L are supported by the frame J, and a brace or framework M is secured at its upper end to the frame of the machine and extends downwardly and around the frame J in the manner shown. In the lower portion of the frame J are a plurality of guides or slots N, equal in number with the spouts, and extending through the bottom of the spout is a pin P, that passes through these guide-slots N. A nut Q upon said pin P holds the spring R against the rear side of the frame J and affords sufficient friction to hold the spouts in their adjusted position.

The operation is as follows: It is understood that it is sometimes desired to distribute the fertilizer over a considerable area, and in using my machine the spouts would be moved to the position shown in Fig. 2, where they diverge and distribute the fertilizer equally over the area covered by lower ends of said spouts, it being understood that it is necessary only to move the spouts to the position shown, as the pressure of the springs R permits this, but will hold the spouts in place.

Of course if it is desired to distribute the fertilizer over a narrow path the lower ends of the spouts are moved together so as to converge.

Having thus described my invention, what I claim as new, and desire to secure by Letters Patent, is—

1. A fertilizer-distributer, provided with a plurality of spouts, said spouts being independently movable transversely to the length of the machine.

2. A fertilizer-distributer, having a plurality of channels leading from the hopper, and spouts at the lower ends of said channels movable transversely to the length of the machine.

3. A fertilizer-distributer, having a plurality of channels leading from the hopper, spouts pivoted at the lower end of said channels, and means for holding said spouts in adjusted positions.

4. A fertilizer-distributer, having a plurality of channels leading from the hopper, spouts pivoted independently at the lower end of said channels, a frame upon which said spouts are supported, and friction devices carried by the spouts and engaging said frame.

5. A fertilizer-distributer, having a plurality of channels leading from the hopper, spouts pivoted at the lower end of said channels, a frame extending below said channels and in the rear of said spout, guide-slots in said frame, pins carried by said spouts extending through said guide-slots, and friction devices mounted upon said pins and engaging said frame.

ALLEN McWHORTER.

Witnesses:
JOHN A. WIEDERSHEIM,
C. D. McVAY.